(12) United States Patent
Chana et al.

(10) Patent No.: US 11,384,673 B2
(45) Date of Patent: Jul. 12, 2022

(54) ENERGY RECOVERY SYSTEM, VEHICLE, AND METHOD OF RECOVERING ENERGY

(71) Applicant: Oxford University Innovation Limited, Oxford (GB)

(72) Inventors: Kamaljit Singh Chana, Oxford (GB); Vikram Sridhar, Oxford (GB); Sunny Singh Chana, Oxford (GB); Michael Joseph Pekris, Richmond (GB)

(73) Assignee: OXFORD UNIVERSITY INNOVATION LIMITED

( * ) Notice: Subject to any disclaimer, the term of this patent is extended or adjusted under 35 U.S.C. 154(b) by 162 days.

(21) Appl. No.: 16/759,753

(22) PCT Filed: Nov. 2, 2018

(86) PCT No.: PCT/GB2018/053193
§ 371 (c)(1),
(2) Date: Apr. 28, 2020

(87) PCT Pub. No.: WO2019/086896
PCT Pub. Date: May 9, 2019

(65) Prior Publication Data
US 2021/0180502 A1    Jun. 17, 2021

(30) Foreign Application Priority Data

Nov. 3, 2017 (GB) ..................................... 1718253

(51) Int. Cl.
*F01N 5/02* (2006.01)
*B60K 13/04* (2006.01)
(Continued)

(52) U.S. Cl.
CPC .............. *F01N 5/025* (2013.01); *B60K 13/04* (2013.01); *F01N 3/0205* (2013.01);
(Continued)

(58) Field of Classification Search
CPC .... F01N 3/0205; F01N 3/0234; F01N 3/2889; F01N 5/025; F01N 2240/02
See application file for complete search history.

(56) References Cited

U.S. PATENT DOCUMENTS

2008/0210480 A1    9/2008  Krazner
2009/0260775 A1   10/2009  Maucher et al.
(Continued)

FOREIGN PATENT DOCUMENTS

CN    103485867 A    1/2014
DE      4140953 A1   6/1993
(Continued)

OTHER PUBLICATIONS

International Search Report and Written Opinion for PCT/GB2018/053193, dated Feb. 4, 2019, pp. 1-9.
(Continued)

*Primary Examiner* — Jonathan R Matthias
(74) *Attorney, Agent, or Firm* — Thomas | Horstemeyer, LLP

(57) ABSTRACT

An energy recovery system and a method of recovering energy are disclosed. In one arrangement, an exhaust gas conduit system guides a flow of exhaust gas generated by a combustion process. A heat exchange fluid circuit guides a flow of a heat exchange fluid. An electrical generator generates electrical power from the flow of heat exchange fluid. The heat exchange fluid circuit is configured so that heat is transferred from the exhaust gas to the heat exchange fluid while the exhaust gas is flowing through the exhaust gas conduit system.

18 Claims, 12 Drawing Sheets

Figure 1:
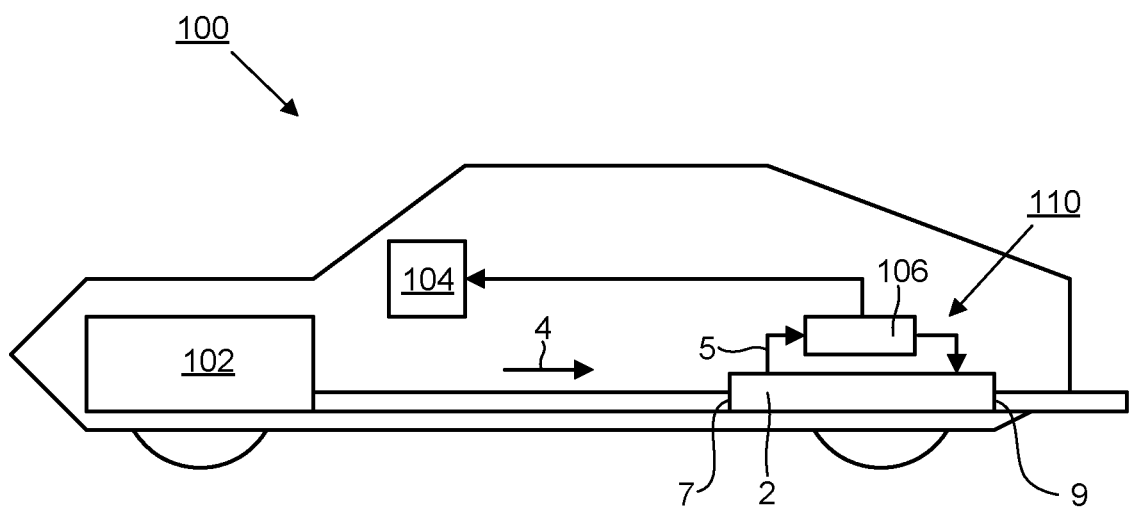

(51) Int. Cl.
*F01N 3/02* (2006.01)
*F01N 3/28* (2006.01)
*F28D 7/08* (2006.01)
*F28D 7/10* (2006.01)
*F28D 7/16* (2006.01)

(52) U.S. Cl.
CPC ............. *F01N 3/2889* (2013.01); *F28D 7/08* (2013.01); *F28D 7/10* (2013.01); *F28D 7/1615* (2013.01); *B60Y 2400/206* (2013.01); *F01N 2240/02* (2013.01)

(56) References Cited

U.S. PATENT DOCUMENTS

| | | | |
|---|---|---|---|
| 2011/0120106 A1* | 5/2011 | Bruck | ..................... F01N 5/025 60/320 |
| 2012/0031079 A1 | 2/2012 | Spicer et al. | |
| 2012/0192560 A1* | 8/2012 | Ernst | ..................... F02M 26/25 60/616 |
| 2013/0219880 A1 | 8/2013 | Irmler | |
| 2015/0135689 A1* | 5/2015 | Resch | ................... H01L 35/325 60/320 |
| 2016/0290733 A1 | 10/2016 | Noishiki et al. | |
| 2017/0335805 A1* | 11/2017 | Zhang | ..................... F01N 3/20 |
| 2018/0319390 A1 | 11/2018 | Gaviani et al. | |

FOREIGN PATENT DOCUMENTS

| | | |
|---|---|---|
| DE | 202007000732 U1 | 4/2007 |
| DE | 102015110974 A1 | 1/2017 |
| GB | 2533648 A | 6/2016 |
| IN | 3505CHENP2013 A | 10/2010 |
| KR | 20150072077 A * | 6/2015 |
| WO | 2012/061812 A2 | 5/2012 |

OTHER PUBLICATIONS

UK Search Report for GB 1718253.6, dated Feb. 28, 2018, pp. 1-6.
International Preliminary Report on Patentability for PCT/GB2018/053193, dated May 5, 2020, pp. 1-6.

* cited by examiner

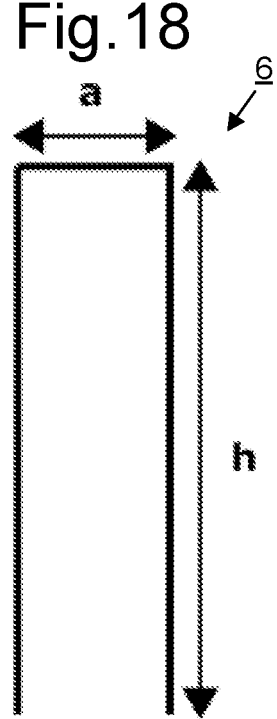
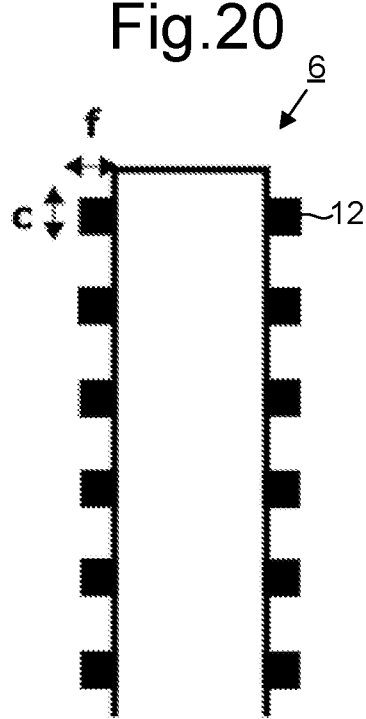
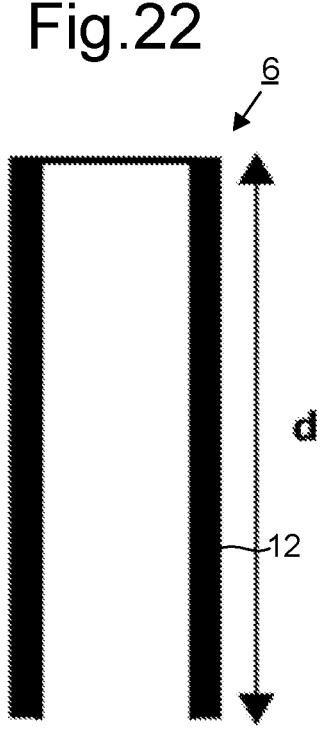
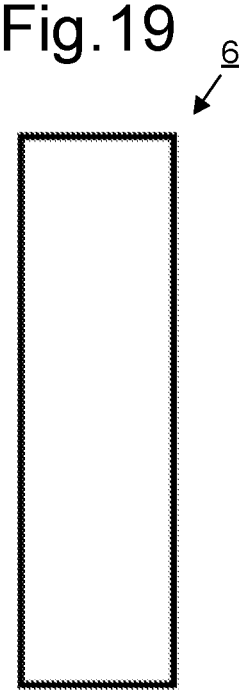
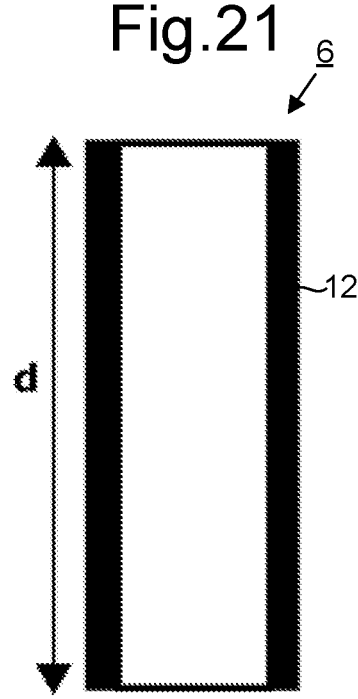
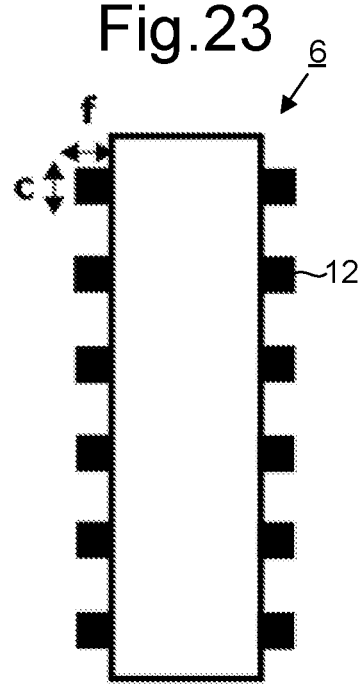

ENERGY RECOVERY SYSTEM, VEHICLE, AND METHOD OF RECOVERING ENERGY

CROSS-REFERENCE TO RELATED APPLICATIONS

This application is the National Stage of International Application No. PCT/GB2018/053193, filed Nov. 2, 2018, which claims priority to GB 1718253.6, filed Nov. 3, 2017, which are entirely incorporated herein by reference.

The present invention relates to energy recovery from a flow of exhaust gas generated by a combustion process, particularly from an internal combustion engine.

It is desirable to improve the efficiency of apparatus and machines that generate exhaust gas. It is also desirable to minimise noise.

Exhaust silencers are known, but these devices can reduce performance by adding weight and/or by creating undesirable back pressures.

Various approaches are available for improving the efficiency of internal combustion engines, but the improvements can significantly increase the cost of manufacture, as well as compromising performance or vehicle range.

It is an object of the invention to provide alternative approaches for improving efficiency and/or reducing noise.

According to an aspect, there is provided an energy recovery system, comprising: an exhaust gas conduit system configured to guide a flow of exhaust gas generated by a combustion process; a heat exchange fluid circuit configured to guide a flow of a heat exchange fluid; and an electrical generator configured to generate electrical power from the flow of heat exchange fluid, wherein: the heat exchange fluid circuit is configured so that heat is transferred from the exhaust gas to the heat exchange fluid while the exhaust gas is flowing through the exhaust gas conduit system.

Thus, instead of being lost to the environment, heat contained in exhaust gas can be extracted and transformed into electrical form. The energy recovery system also reduces pressure and temperature in the flow of exhaust gas, which will reduce noise associated with the exhaust system. The need for additional silencers is thereby reduced. Any additional silencer that is needed can be smaller and lighter than would otherwise be the case. The energy recovery system can be incorporated easily and cheaply into existing machines, with minimal modification. The exhaust gas conduit system can be provided in series with existing components of the exhaust system. The energy recovery system can reduce the size of battery systems needed for vehicles, thereby saving weight. The system may be particularly desirable when used in combination with engines that typically have hotter exhausts, such as rotary engines. The system may be incorporated particularly efficiently into hybrid vehicles in which the exhaust gas is produced by a range extending internal combustion engine. The system may be particularly attractive for use in aircraft, particularly smaller aircraft and unmanned aircraft. The energy recovered can be used to power avionics or other on-board systems, thereby providing a net weight reduction from reduced or eliminated batteries.

In some embodiments, the energy recovery system is implemented as part of a marine engine, as part of a generator set, as part of an oil or chemical refinery, or as part of a factory (e.g. chemical) plant waste heat recovery system. In applications such as these where reducing weight is less of a priority (compared with aeronautical applications for example), the increased design freedom may be used to improve efficiency of the energy recovery and/or reduce noise.

In an embodiment, the exhaust gas conduit system comprises a plurality of flow diverting structures that are each configured to locally divert the flow of the exhaust gas. The flow of exhaust gas can thereby be controlled flexibly to increase heat transfer.

In an embodiment, the flow diverting structures cause the exhaust gas to adopt a meandering flow, optionally comprises an alternating sequence of changes in direction of opposite sense of at least 90 degrees. The meandering flow allows efficient heat transfer to be achieved in a compact device.

In an embodiment, the heat exchange fluid flows through an inner region of at least one of the flow diverting structures. This arrangement allows the heat exchange fluid to be brought into close proximity with the exhaust gas in regions where the exhaust gas is being locally diverted, thereby promoting efficient heat exchange.

In an embodiment, a vehicle is provided that has: an internal combustion engine; an electrically powered device or battery; and an energy recovery system according to an embodiment. The energy recovery system is configured to provide electrical power to the electrically powered device or battery. The vehicle can be a land-based vehicle such as a car or truck, or an aircraft.

According to an alternative aspect, there is provided a method of recovering energy, comprising: guiding flow of an exhaust gas generated by a combustion process through an exhaust gas conduit system; guiding flow of a heat exchange fluid through a heat exchange fluid circuit; and generating electrical power from the flow of the heat exchange fluid, wherein heat is transferred from the exhaust gas to the heat exchange fluid while the exhaust gas is flowing through the exhaust gas conduit system.

Figure 28:
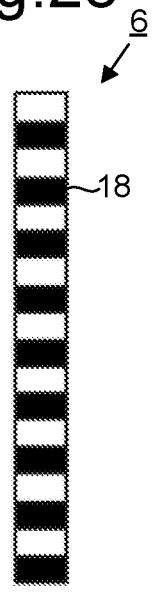
Figure 29:
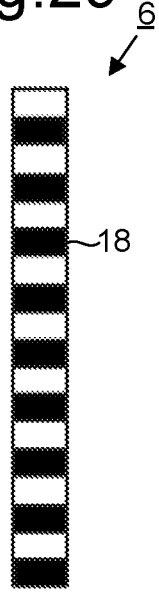
Figure 30:
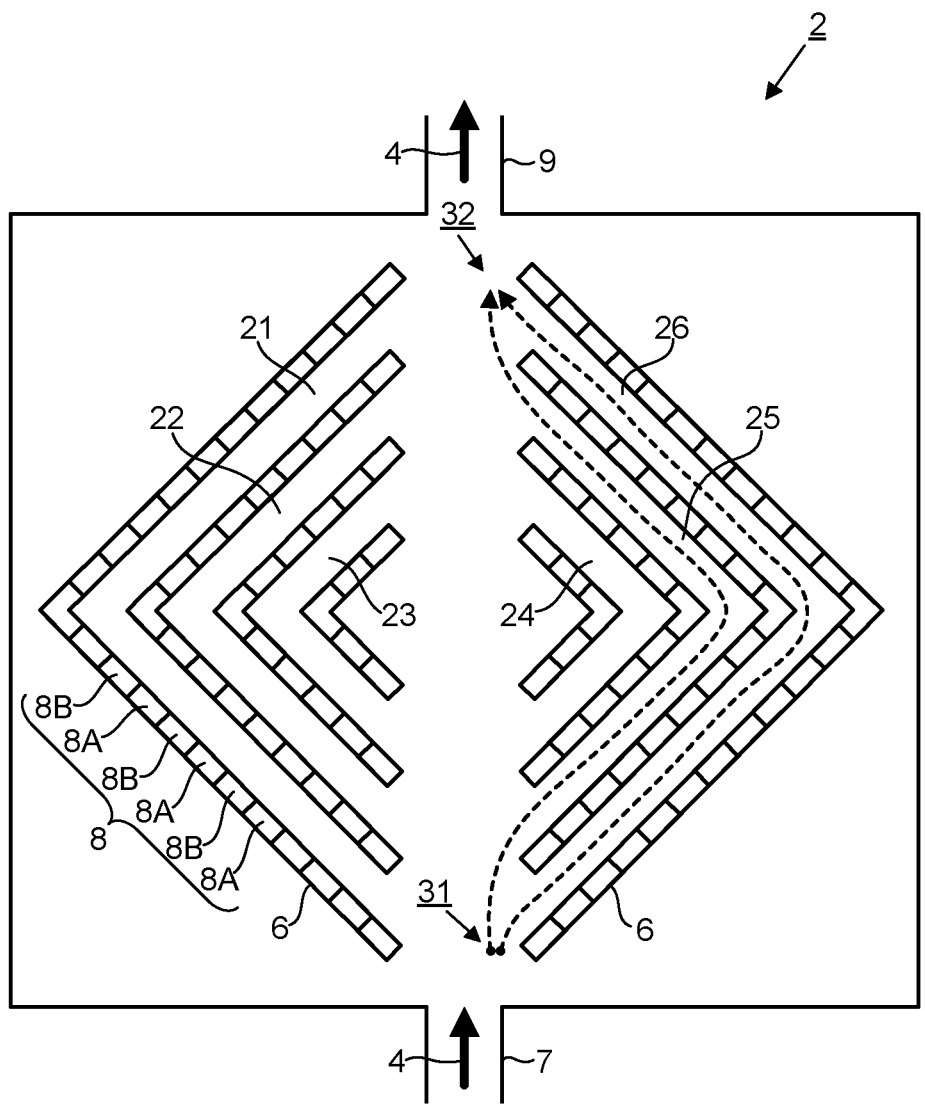

Embodiments of the invention will now be described, by way of example only, with reference to the accompanying drawings in which corresponding reference symbols indicate corresponding parts, and in which:

FIG. 1 depicts an internal combustion engine powered vehicle comprising an energy recovery system according to an embodiment;

FIGS. 2, 4, 6, 8, 10, 12, 14, and 16 are schematic side sectional views of different embodiments of an exhaust gas conduit system and heat exchange fluid circuit, depicting flow of the exhaust gas;

FIGS. 3, 5, 7, 9, 11, 13, 15, and 17 are, respectively, schematic top sectional views of the arrangements of FIGS. 2, 4, 6, 8, 10, 12, 14, and 16 depicting flow of a heat exchange fluid;

FIGS. 18, 20, 22, 24, 26, and 28 are schematic side views of example flow diverting structures having different surface structures;

FIGS. 19, 21, 23, 25, 27, and 29 are, respectively, schematic top views of the arrangements depicted in FIGS. 18, 20, 22, 24, 26 and 28; and FIG. 30 is a schematic top sectional view of a further example of an exhaust gas conduit system configured to suppress noise via destructive interference.

Embodiments of the present disclosure relate to an energy recovery system for recovering energy from a flow of exhaust gas from a combustion process, such as the combustion process occurring within an internal combustion engine. Embodiments are particularly applicable to implementation within a vehicle comprising an internal combustion engine, including land-based vehicles and aircraft, and hybrid vehicles that incorporate a range extending internal combustion engine. FIG. 1 schematically illustrates an example configuration. A vehicle 100 comprises an internal combustion engine 102. Operation of the internal combustion engine 102 generates a flow 4 of exhaust gas. An energy recovery system 110 is provided for recovering energy from the flow 4 of exhaust gas. The vehicle 100 comprises an electrically powered device or battery 104. The energy recovery system 110 provides electrical power to the electrically powered device or battery 104.

The energy recovery system 110 comprises an exhaust gas conduit system 2. The exhaust gas conduit system 2 guides the flow 4 of exhaust gas from an inlet 7 of the exhaust gas conduit system 2 to an outlet 9 of the exhaust gas conduit system 2. The exhaust gas conduit system 2 may thus be connected in series with piping of a standard vehicle exhaust system, downstream from the internal combustion engine 102 and upstream from where the exhaust system finally outputs the exhaust gases to the environment. The exhaust gas conduit system 2 could also be connected directly to the engine and/or output exhaust gas directly to the environment.

A heat exchange fluid circuit guides a flow 5 of a heat exchange fluid (driven by a pump) between the exhaust gas conduit system 2 and an electrical generator 106. The electrical generator 106 generates electrical power from the flow 5 of the heat exchange fluid. The generated power is supplied to the electrically powered device or battery 104. The heat exchange fluid circuit is configured in such a way that heat is transferred from the exhaust gas to the heat exchange fluid while the exhaust gas is flowing through the exhaust gas conduit system 2. The heat exchange fluid is selected so that the heat exchange fluid is transformed from a liquid to a vapour in each cycle of the heat exchange fluid through the heat exchange circuit. The heat exchange fluid may for example comprise a suitable low boiling point, organic liquid. Various mixtures (e.g. comprising plural liquid components of different composition) can be used to select the boiling point desired. The heat exchange fluid circuit may comprise a heat exchange passage in which the heat exchange fluid is separated from the exhaust gas by a single wall. The single wall comprises an integral structure (i.e. the thickness of the wall) extending continuously (i.e. without air gaps) from the heat exchange fluid to the exhaust gas. As described below, the heat exchange passage may be formed at least partially by inner regions 8 within flow diverting structures 6, in which case the walls of the flow diverting structures form the single walls separating the heat exchange fluid from the exhaust gas.

Figure 2:
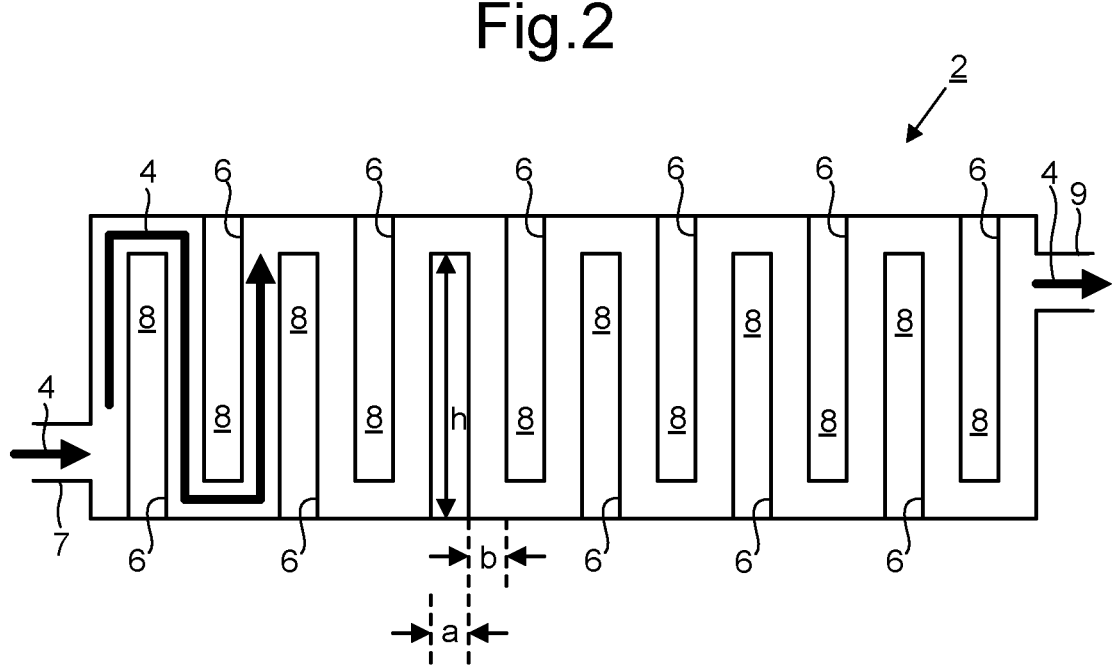
Figure 3:
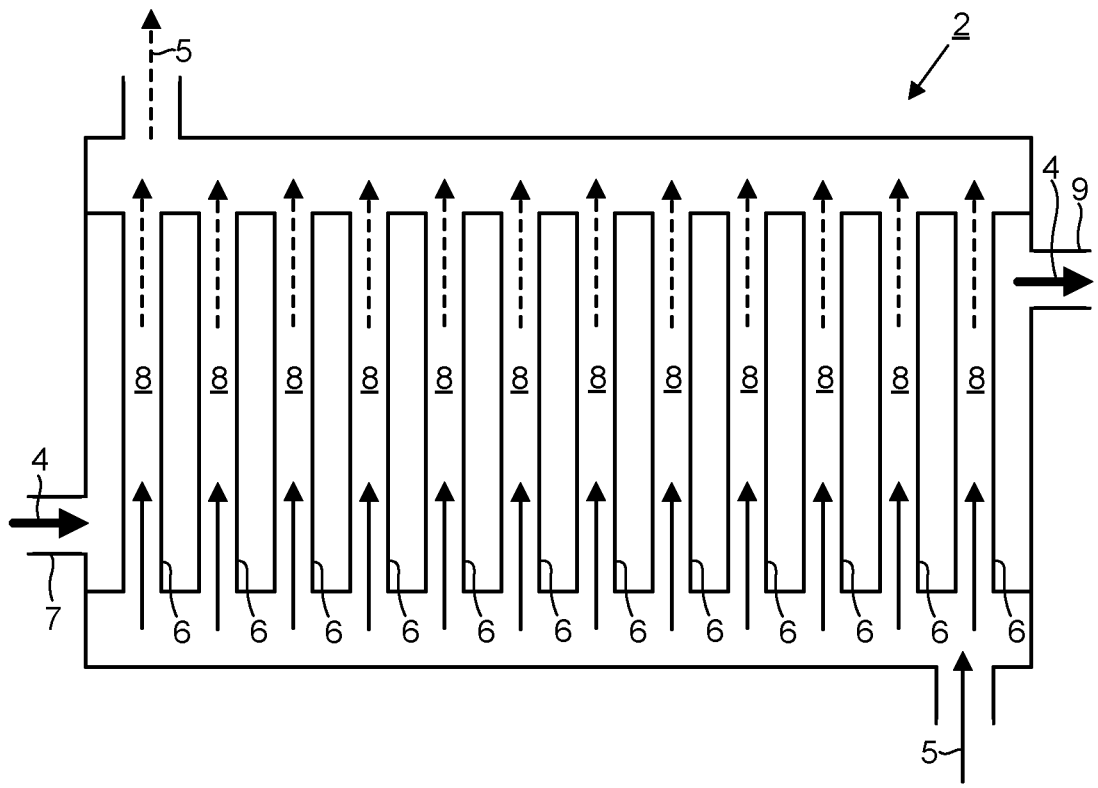

An example exhaust gas conduit system 2 is depicted in FIGS. 2 and 3. FIG. 2 is a schematic side sectional view and FIG. 3 is a schematic top sectional view. Both views are perpendicular to an average direction of flow of the exhaust gas. Thus, in the case where exhaust gas flows generally in a direction opposite to a direction of travel of a vehicle powered by the internal combustion engine, the side view could be a view from the side of the vehicle and the top view could be a view from the top of the vehicle (or vice versa).

Flow 4 of exhaust gas through the exhaust gas conduit system 2 is depicted by the thick arrows. As depicted most clearly in FIG. 2, the flow 4 of exhaust gas adopts a meandering rather than straight flow through the exhaust gas conduit system 2. The meandering flow enhances transfer of heat from the exhaust gas to the heat exchange fluid. The meandering flow may be created by flow diverting structures 6, as shown in FIGS. 2 and 3. The shapes and dimensions of the flow diverting structures 6 (e.g. width a, height h, and separation b) can be tuned to get optimal heat transfer from the exhaust gas to the heat exchange fluid for the expected operating conditions (e.g. exhaust gas flow rate, temperature, etc.). In the example shown, each flow diverting structure 6 is substantially planar, or plate-like, with smooth outer surfaces, but other shapes and surface textures are possible. Some examples are discussed below with reference to FIGS. 18-30. A plurality of the flow diverting structures 6 may be provided. Each flow diverting structure 6 locally diverts the flow 4 of the exhaust gas. The meandering flow may comprise an alternating sequence of changes in direction of opposite sense of at least 90 degrees, optionally at least 120 degrees, optionally at least 150 degrees, optionally substantially 180 degrees or more. In the example of FIG. 2, the flow 4 of exhaust gas enters at inlet 7 on the left of the figure and is diverted upwards by the first flow diverting structure 6 that is encountered. Subsequently, the flow 4 is diverted downwards by the next flow diverting structure 6 that is encountered. Subsequently, the flow is diverted in an alternating sequence of upwards diversion and downwards diversion by a corresponding sequence of flow diverting structures 6, to adopt a meandering flow through the exhaust gas conduit system 2. The meandering flow in this embodiment thus comprises an alternating sequence of opposite changes in direction of substantially 180 degrees.

The heat exchange fluid circuit is configured so that the heat exchange fluid flows through an inner region 8 of at least one of the flow diverting structures 6. In the example of FIGS. 2 and 3, the heat exchange fluid flows through the inner region 8 of each and every one of the flow diverting structures 6. The heat exchange fluid thus flows through regions which are in close proximity to the flow 4 of exhaust gas, thus promoting efficient heat transfer between the exhaust gas and the heat exchange fluid. Furthermore, the heat exchange fluid flows through regions which are adjacent to surfaces which are redirecting the flow of exhaust gas (e.g. separated therefrom by a single wall of integrally continuous material). The flow of exhaust gas thus flows into the surfaces (rather than flowing in a direction that is purely parallel to the surfaces), which enhances transfer of heat from the exhaust gas to the heat exchange fluid. In the embodiment shown (and in other embodiments), the inner region 8 of one or more of the flow diverting structures 6 is sandwiched on both sides by the flow 4 of exhaust gas, in an average flow direction. In the example of FIG. 2, for example, the average flow direction is horizontally from left to right. The inner regions 8 are sandwiched on both sides by the flow 4 of exhaust gas in this direction. In each case, on one side the flow 4 is upwards and on the other side the flow 4 is downwards. Transfer of heat from the exhaust gas to the heat exchange fluid in the inner region 8 can thus occur in two directions (i.e. from the left and from the right in the orientation shown in FIG. 2). Efficient transfer of the heat from the exhaust gas to the heat exchange fluid is thereby promoted.

In embodiments of the disclosure, the flow diverting structures 6 form an alternating sequence of first flow diverting structures and second flow diverting structures. The first flow diverting structures all protrude into the flow 4 of the exhaust gas in an opposite sense relative to all of the second flow diverting structures along a direction perpendicular to an average flow direction of the exhaust gas through the exhaust gas conduit system. In the example of FIG. 2, the direction perpendicular to the average flow direction would be an upwards or downwards direction. The first flow diverting structures would then correspond to the flow diverting structures 6 that extend vertically upwards.

The second flow diverting structures correspond to the flow diverting structures 6 that extend downwards. One or more of the first and second flow diverting structures may extend at an oblique angle to the perpendicular to the average flow direction. In this case, projections of the first flow diverting structures onto the perpendicular to the average flow direction should be oppositely directed to projections of the second flow diverting structures onto the perpendicular to the average flow direction. Thus, in the orientation shown in FIG. 2, all of the first flow diverting structures should point generally upwards (directly or at an oblique angle) and all of the second flow diverting structures should point generally downwards (directly or at an oblique angle).

The protruding first and second flow diverting structures protrude into the flow 4 of the exhaust gas at different longitudinal positions relative to the average flow direction. In the example of FIG. 2, the average flow direction is from left to right, horizontally, so the different longitudinal positions relative to the average flow direction correspond to different positions in the horizontal direction. In the example of FIG. 2, each of the flow diverting structures 6 is separated in a horizontal direction from each of the other flow diverting structures 6.

In embodiments of the disclosure, the protruding first and second flow diverting structures interlock in a direction perpendicular to the average flow direction. The interlocking promotes a meandering flow of the exhaust gas.

In embodiments of the disclosure, at least a subset of flow diverting structures 6 protrude into the flow 4 of the exhaust gas substantially perpendicularly to the average flow direction. The embodiment of FIGS. 2 and 3 is an example of this type. Arranging for the flow diverting structures 6 to extend perpendicularly causes particularly efficient redirection of the flow 4, thereby efficiently providing a meandering flow and/or encouraging efficient transfer of heat from the flow 4 of exhaust gas to the heat exchange fluid. It is also possible, as mentioned above, for one or more of the flow diverting structures 6 to protrude into the flow of the exhaust gas at an oblique angle relative to the average flow direction (less than 90 degrees), thereby reducing flow resistance through the exhaust gas conduit system 2 relative to the case where the flow diverting structures protrude perpendicularly or by more than 90 degrees. Reducing flow resistance may desirably reduce back pressures.

As depicted in FIG. 3, the inner regions 8 of the flow diverting structures 6 may be connected together to form a parallel flow arrangement for the heat exchange fluid. This approach provides a relatively low flow resistance for the heat exchange fluid through the flow diverting structures 6. The flow diverting structures 6 are arranged relative to the flow 4 of the exhaust gas so that the heat exchange fluid still absorbs enough energy from the exhaust gas for the heat exchange fluid to be transformed from a liquid form (as depicted by the solid arrows) flowing through the flow diverting structures 6) to a gaseous from (depicted by the broken line arrows flowing through the flow diverting structures 6).

The flow diverting structures 6 in this embodiment cause the exhaust gas to adopt a spatially periodic meandering flow through at least a portion of the exhaust gas conduit system (as depicted in FIG. 2). In contrast, the heat exchange fluid circuit causes the heat exchange fluid to flow substantially uniformly through the heat exchange fluid circuit (without periodic meandering).

Figure 4:
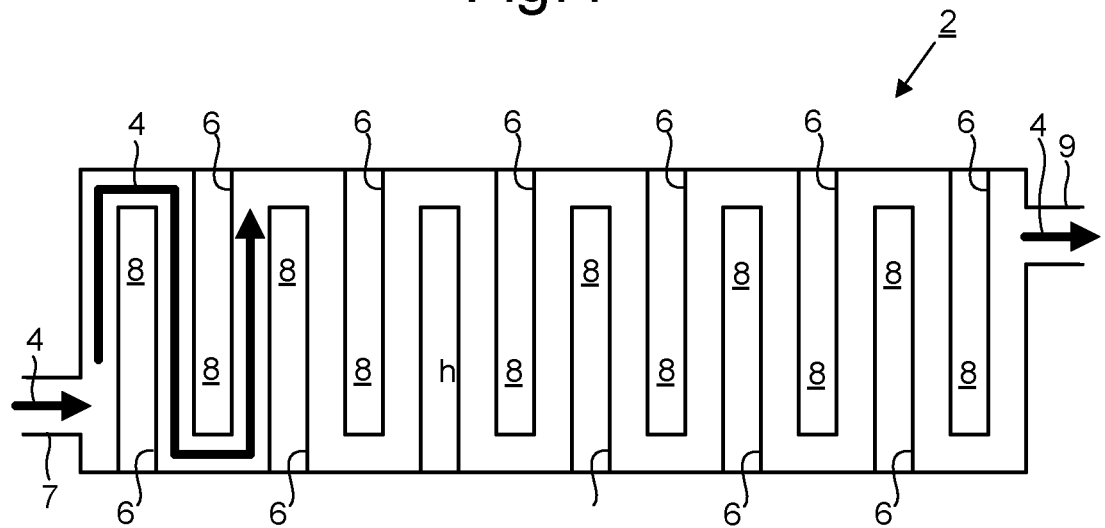
Figure 5:
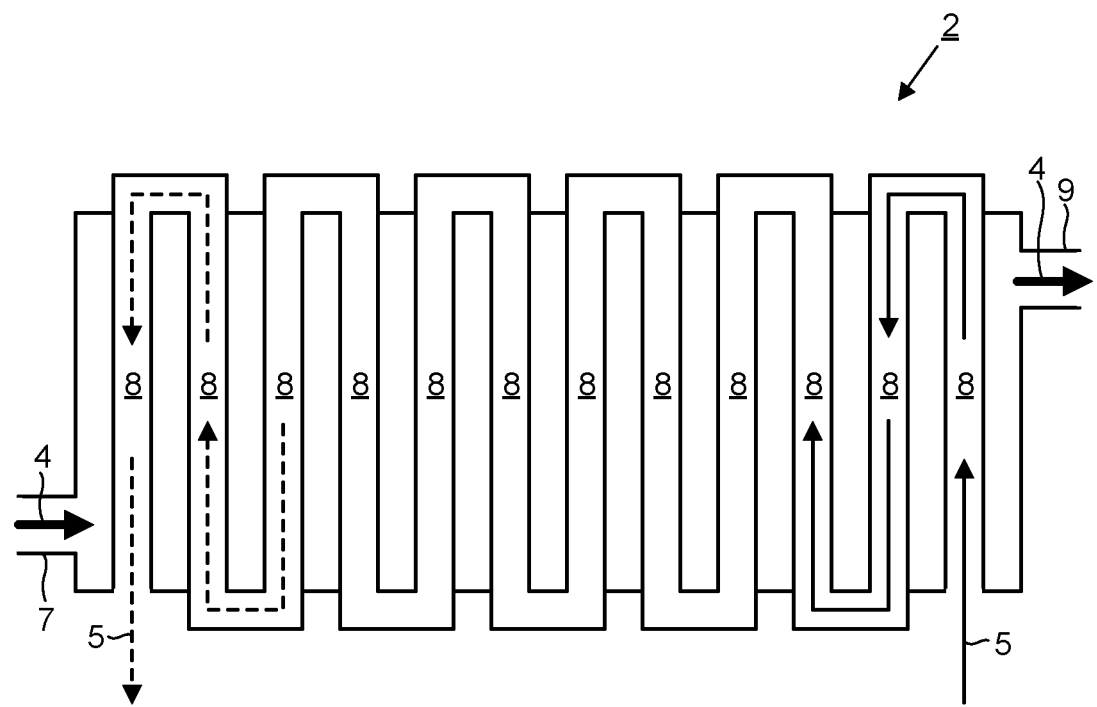

FIGS. 4 and 5 depict an alternative embodiment, in which both the exhaust gas and the heat exchange fluid adopt spatially periodic meandering flows. The periodic meandering flow of the exhaust gas is depicted in FIG. 4. The periodic meandering flow of the heat exchange fluid is depicted in FIG. 5. The periodic meandering flow of the exhaust gas has the same spatial frequency as the periodic meandering flow of the heat exchange fluid. The meandering flow of the heat exchange fluid weaves around and interlocks with the meandering flow of the exhaust gas. The interlocking meandering flows provide efficient transfer of heat from the exhaust gas to the heat exchange fluid. In contrast to the arrangement of FIG. 3, the inner regions 8 of the flow diverting structures 6 in FIG. 5 are connected together to form a series flow arrangement.

In arrangement of the type shown in FIGS. 4 and 5, the periodic meandering flow of the exhaust gas has a maximal amplitude in a first plane. In the example shown, the first plane is in the plane of the page of FIG. 4. The periodic meandering flow of the heat exchange fluid has a maximal amplitude in a second plane. In the example shown, the second plane is in the plane of the page of FIG. 5. The first plane is angled relative to the second plane by at least 45 degrees. In the particular example shown, the first plane is substantially perpendicular to the second plane.

Figure 6:
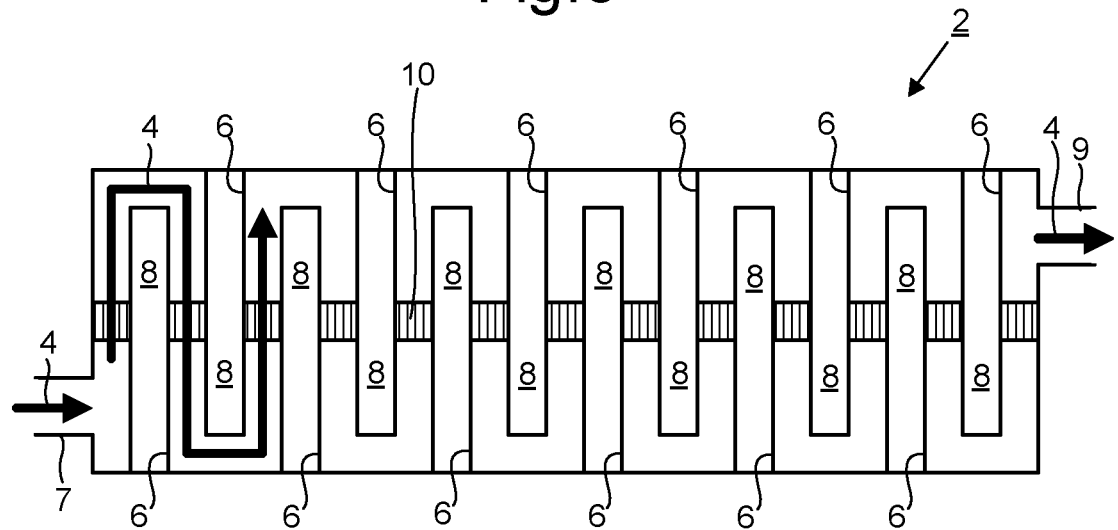
Figure 7:
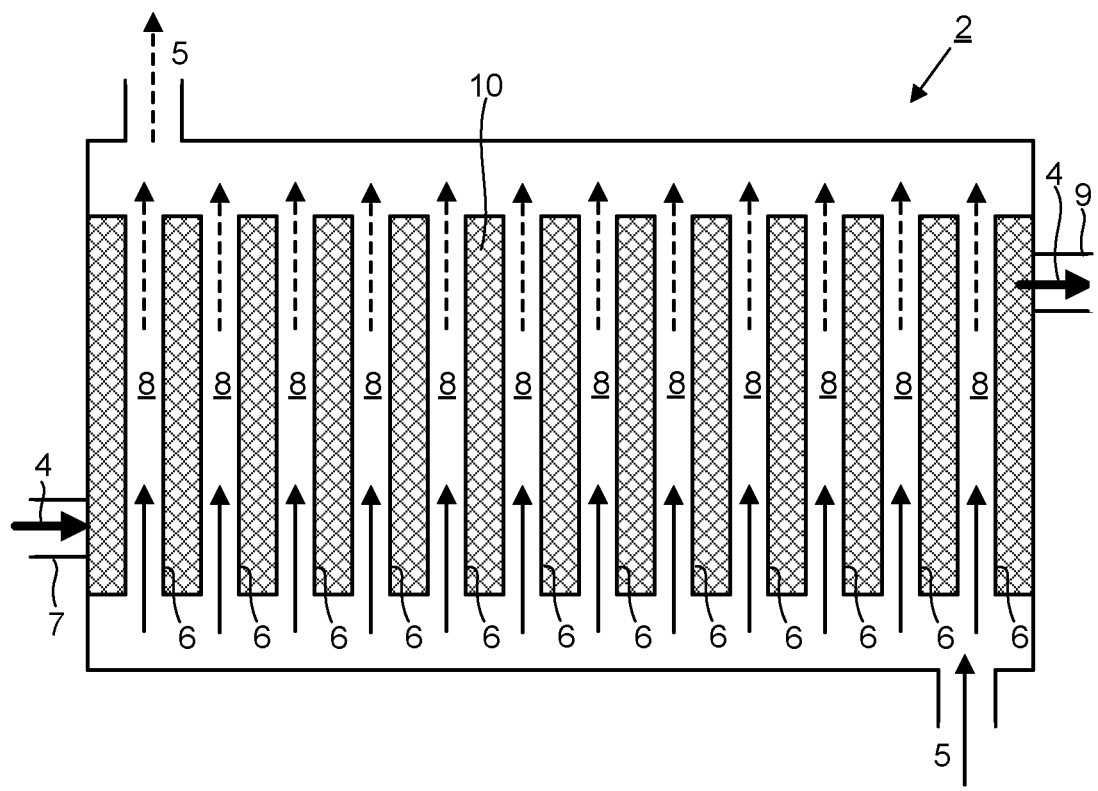
Figure 8:
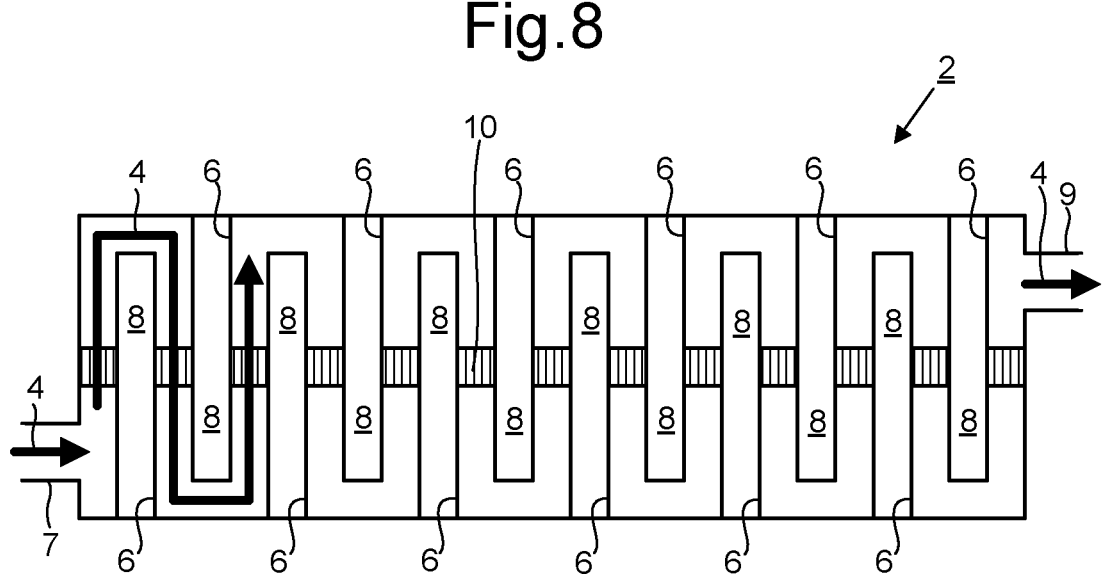
Figure 9:
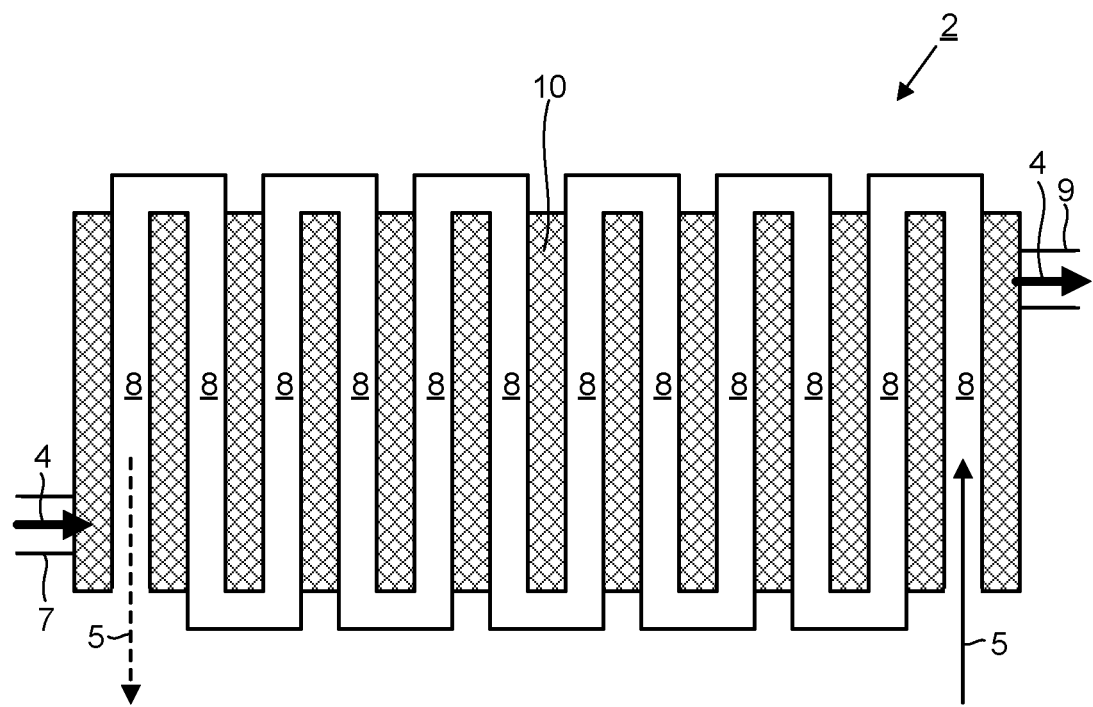

In an embodiment, the exhaust gas conduit system 2 comprises catalytic converter material 10 and the exhaust gas conduit system 2 is configured to guide flow of the exhaust gas through the catalytic converter material 10. The catalytic converter material 10 may comprise at least a portion in which an average pore direction is substantially parallel to a local direction of the exhaust gas directly upstream of the portion of the catalytic converter material 10. The catalytic converter material 10 can thus act to straighten flow, thereby reducing or preventing unwanted cavity resonance modes. FIGS. 6 and 7 show an example implementation for an exhaust gas conduit system 2 of the type depicted in FIGS. 2 and 3. FIGS. 8 and 9 show an example implementation for an exhaust gas conduit system 2 of the type depicted in FIGS. 4 and 5.

Figure 10:
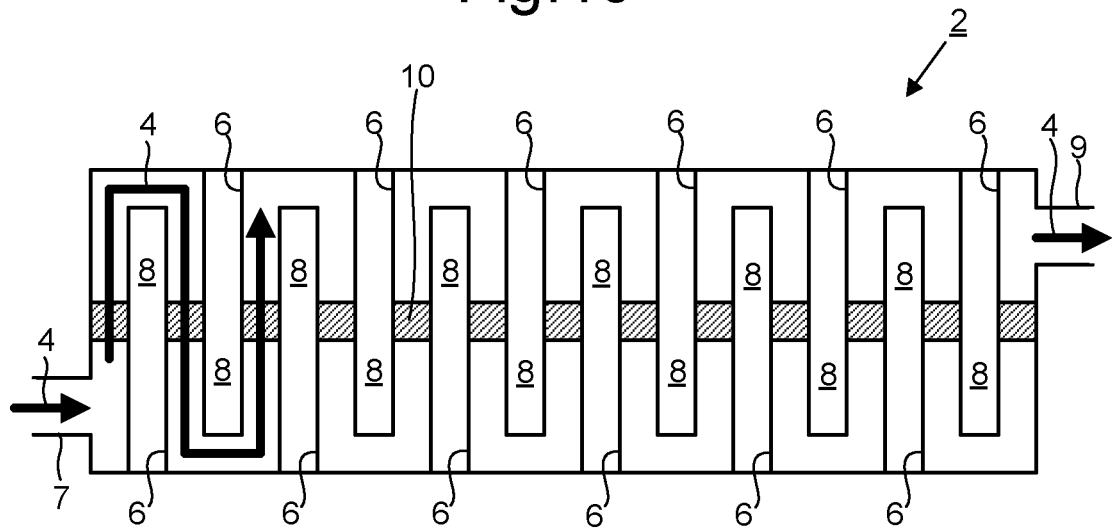
Figure 11:
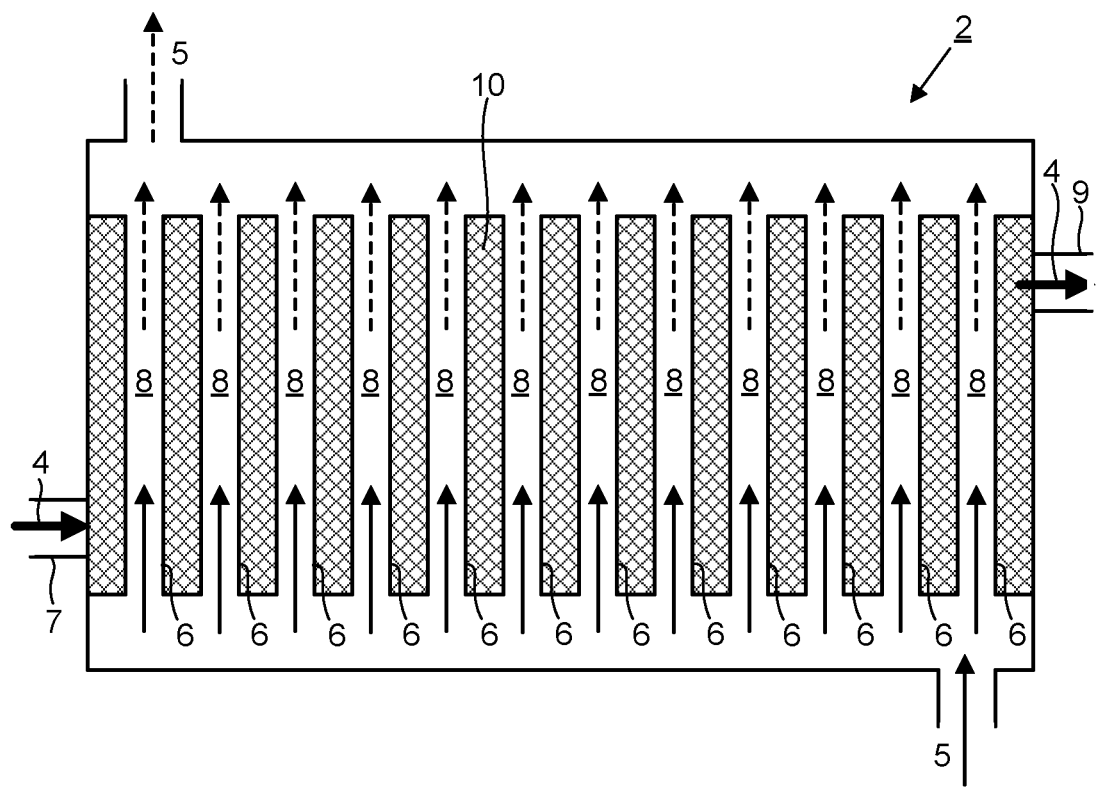
Figure 12:
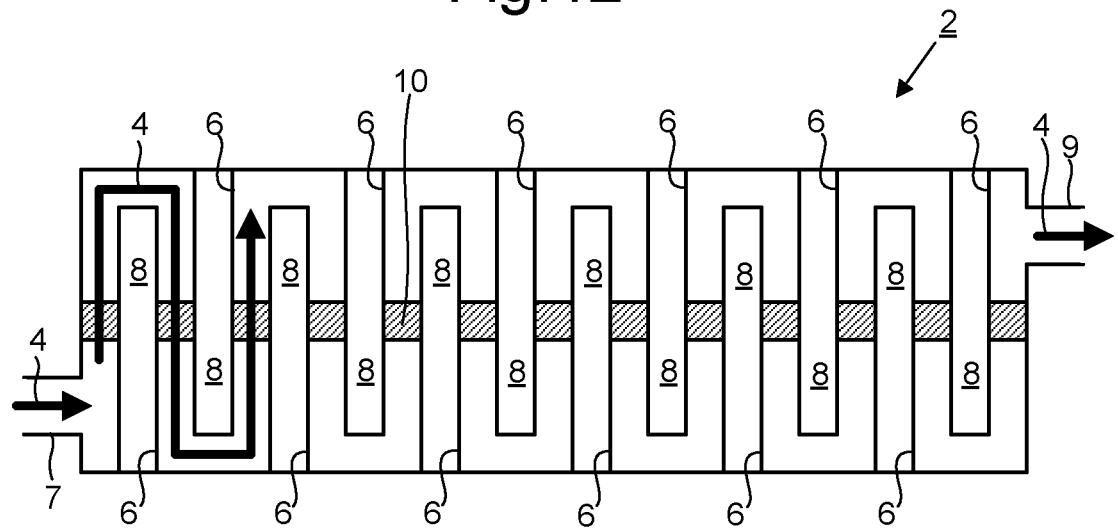
Figure 13:
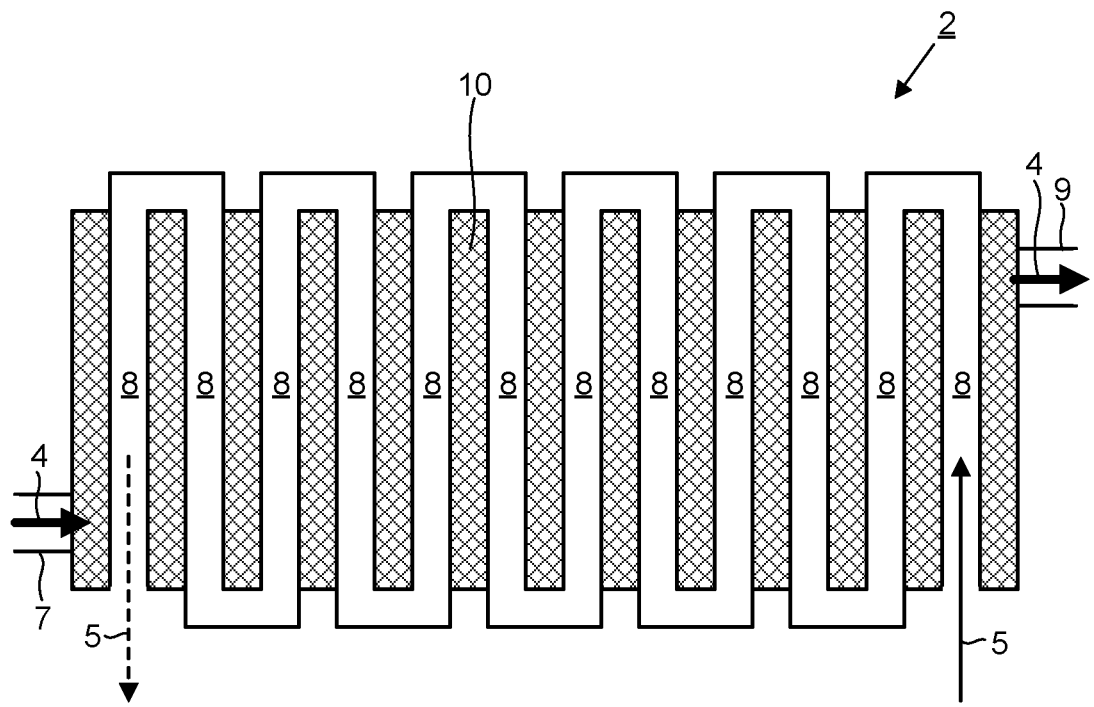

In an alternative arrangement, the catalytic converter material 10 comprises at least a portion in which an average pore direction is aligned obliquely to a local direction of the exhaust gas directly upstream of the portion of the catalytic converter material 10. This may increase interaction between the flow 4 of the exhaust gas and the catalytic converter material 10, thereby improving heat transfer. FIGS. 10 and 11 show an example implementation for an exhaust gas conduit system 2 of the type depicted in FIGS. 2 and 3. FIGS. 12 and 13 show an example implementation for an exhaust gas conduit system 2 of the type depicted in FIGS. 4 and 5.

Figure 14:
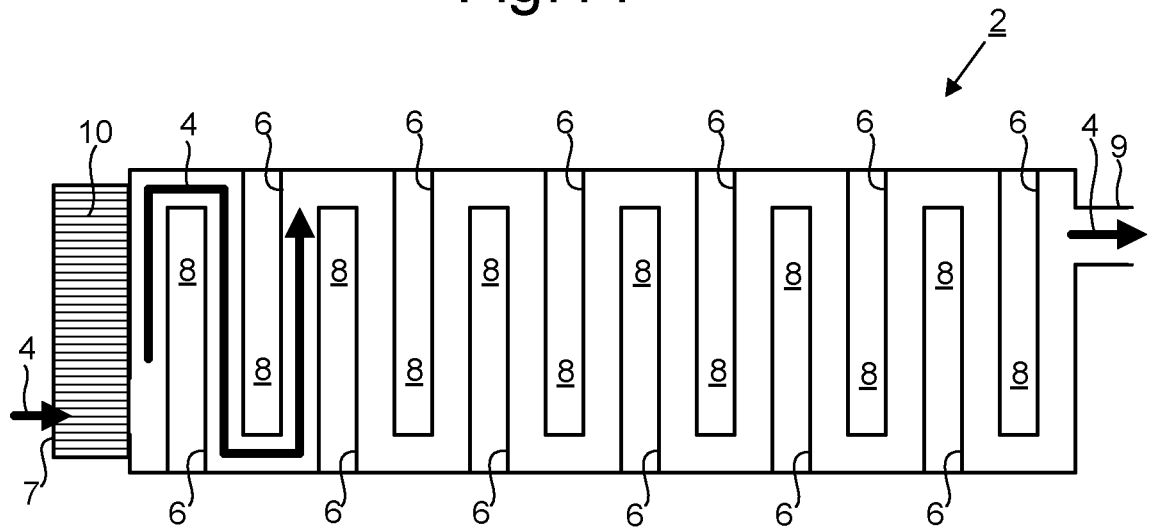
Figure 15:
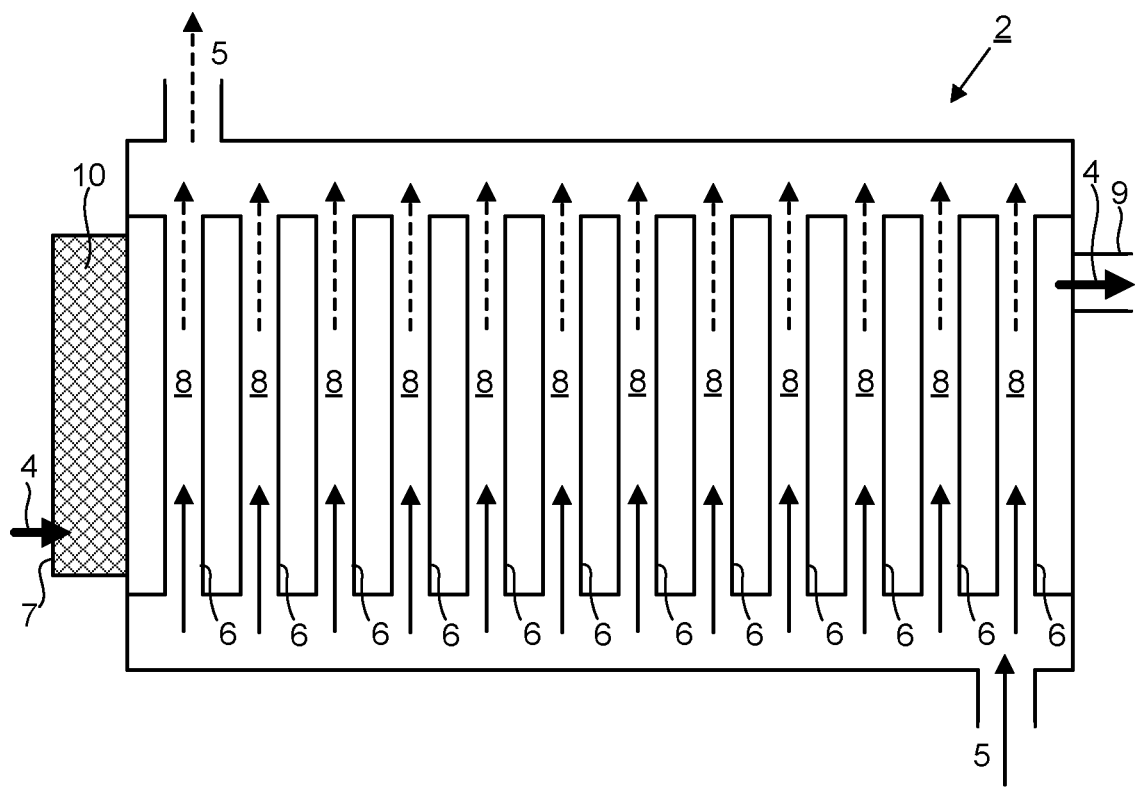
Figure 16:
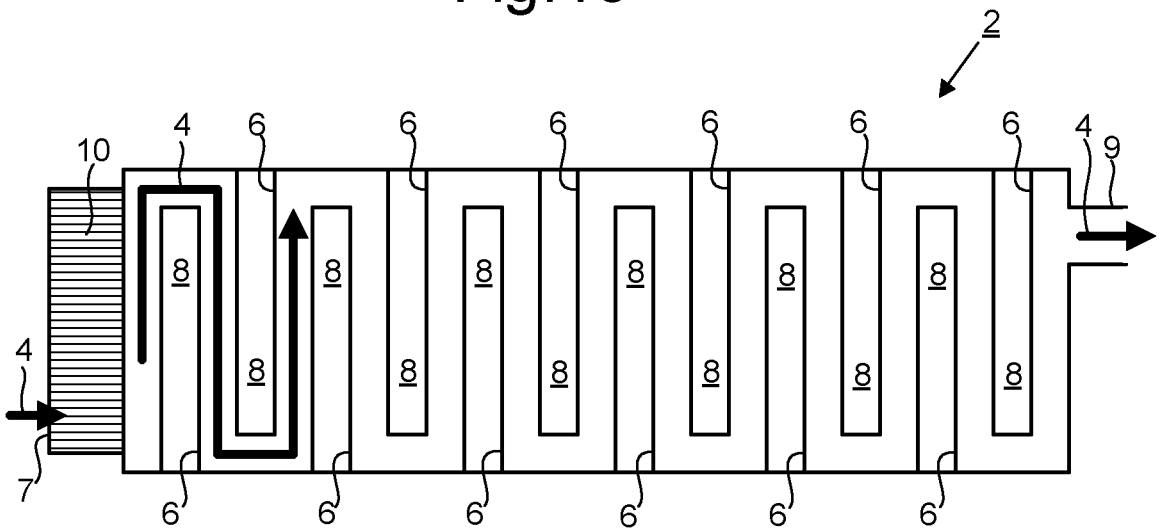
Figure 17:
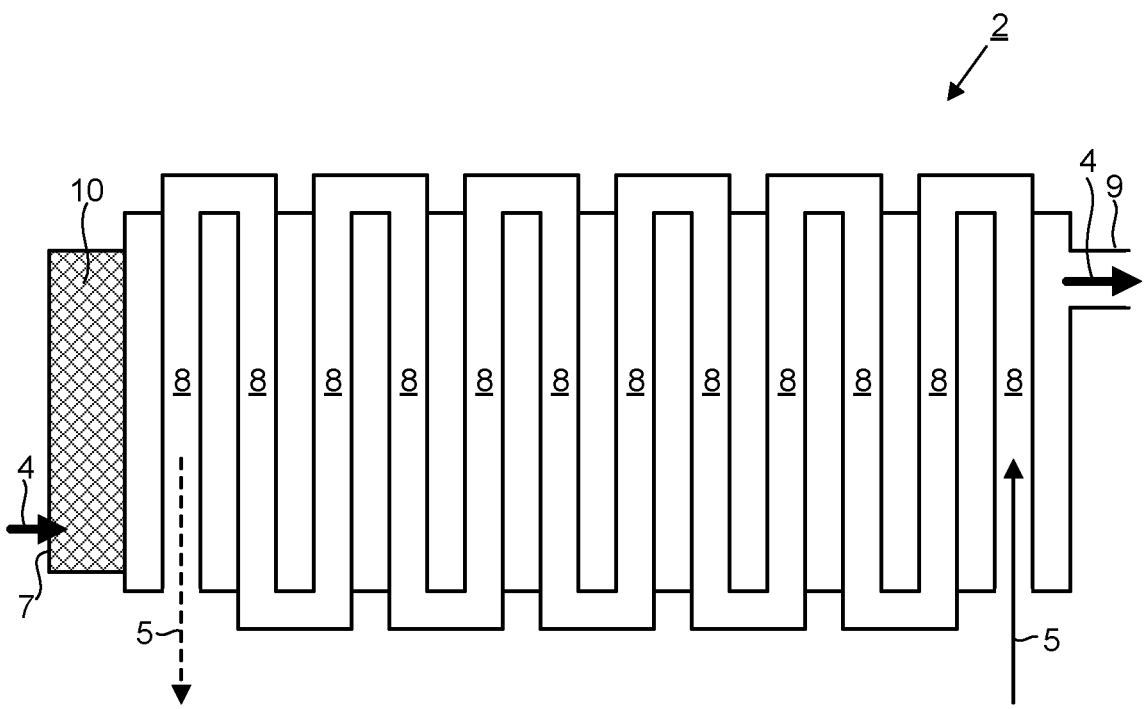

Alternatively or additionally, catalytic converter material 10 may be provided upstream of the portion of the exhaust gas conduit system 2 that interacts with the heat exchange fluid. FIGS. 14 and 15 show an example implementation for an exhaust gas conduit system 2 of the type depicted in FIGS. 2 and 3. FIGS. 16 and 17 show an example implementation for an exhaust gas conduit system 2 of the type depicted in FIGS. 4 and 5.

In any of the embodiments including catalytic converter material 10 discussed above, the catalytic converter material could be replaced (or augmented) by a structure simply having relatively small through-holes (e.g. of the order of 1-3 mm) for the exhaust gas to pass, with heat exchange fluid allowed to pass perpendicularly through the structure to extract heat. Such a configuration would increase the effective area of contact with the exhaust gas. In an embodiment, one or more of the through-holes could be configured to allow contact with catalytic converter material 10 over at least part of the length of the through-hole, for example towards a high temperature end of the through-hole, to additionally provide some catalytic conversion functionality.

Surface and/or internal structure may be provided to the flow diverting structures 6 to enhance heat transfer between the exhaust gas and the heat exchange fluid and/or to adjust aerodynamics. The surface and/or internal structure may include roughness elements on the flow diverting structures 6 or upper/lower/sidewall surfaces of the surrounding cavity (e.g. pimples, dimples, ribs, slots, chevrons, curved elements that cause flow turning, etc.). The surface and/or internal structure may be configured to enhance turbulence and surface area for heat transfer while also increasing pressure loss. Non-limitative examples are described below with reference to FIGS. 18-29. These approaches and others can be used on their own or combined in order to achieve an optimal balance between high heat transfer and low aerodynamic losses.

FIGS. 18 and 19 are, respectively, side and top views of a flow diverting structure 6 without significant surface structure. The flow diverting structure 6 is substantially planar, with smooth exterior walls. As discussed above, the flow diverting structure 6 comprises an inner region (not visible) to allow heat exchange fluid to flow through the flow diverting structure 6. The dimensions a and h can be varied to optimize heat transfer/flow resistance characteristics.

FIGS. 20 and 21 are, respectively, side and top views of a flow diverting structure 6 comprising fins 12. The fins 12 are substantially parallel to each other and perpendicular to the flow 4 of exhaust gas past the flow diverting structure 6. This arrangement will increase heat transfer and flow resistance significantly. The dimensions of the fins 12 (width c, depth f, and length ci) can be varied to optimize heat transfer/flow resistance characteristics.

FIGS. 22 and 23 are, respectively, side and top views of a flow diverting structure 6 comprising fins oriented at 90 degrees relative to the fins 12 of FIGS. 20 and 21. This arrangement will tend to provide lower increases in heat transfer and flow resistance than the arrangement of FIGS. 20 and 21. The dimensions of the fins 12 (width c, depth f, and length a) can be varied to optimize heat transfer/flow resistance characteristics.

Figure 24:
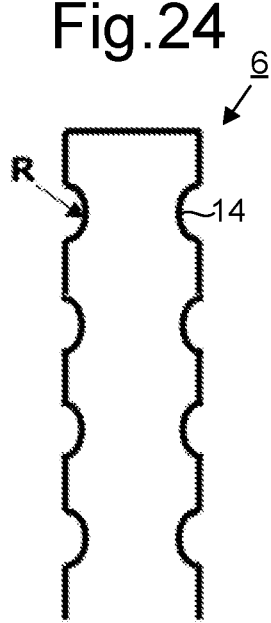
Figure 25:
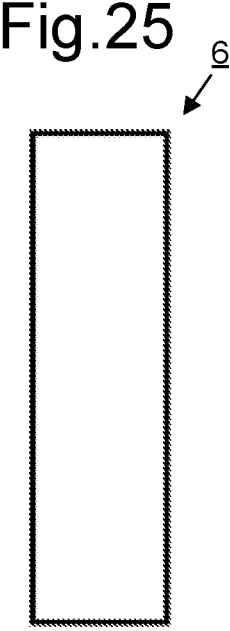

FIGS. 24 and 25 are, respectively, side and top views of a flow diverting structure 6 comprising dimples 14. This approach provides increased heat transfer without a large increase in flow resistance. The shape and dimensions of the dimples (e.g. radius of curvature R in the case where the dimple shape is a portion of a sphere) can be varied to optimize heat transfer/flow resistance characteristics.

Figure 26:
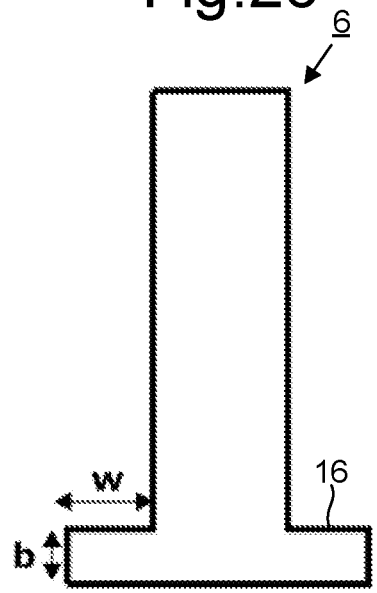
Figure 27:
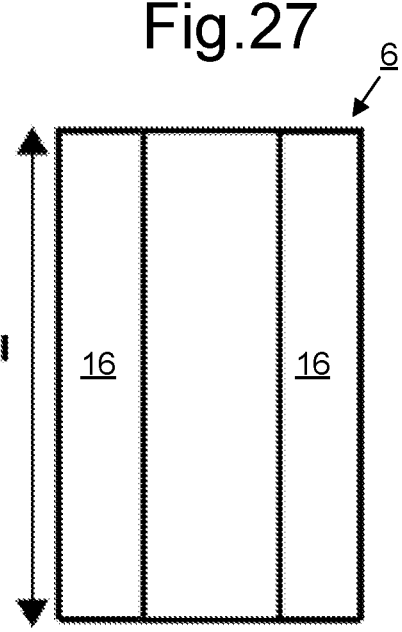

FIGS. 26 and 27 are, respectively, side and top views of a flow diverting structure 6 having an extended base region 16. This approach provides increased heat transfer without a large increase in flow resistance. The shape and dimensions of the extended base region 16 (e.g. height b and depth w) can be varied to optimize heat transfer/flow resistance characteristics.

FIGS. 28 and 29 are, respectively, side and top views of a flow diverting structure 6 comprising thinner walls with supporting ribs 18 extending through the inner region of the flow diverting structure 6. The provision of thinner walls improves heat transfer to the heat exchange fluid, while the ribs 18 cause only a relatively limited increase in flow resistance to the heat exchange fluid.

In further embodiments, one or more of the flow diverting structures 6 comprises one or more through-holes, each of which may optionally be obliquely angled relative to a surrounding surface of the flow diverting structure 6. These may particularly advantageous be applied towards an inlet side of the exhaust gas conduit system (e.g. nearer to an inlet 7 of the exhaust gas conduit system 2 than to an outlet 9 of the exhaust gas conduit system 2). Each such through-hole may be configured to exploit higher upstream total pressure to generate a jet that substantially opposes the flow direction in a region downstream of the flow diverting structure 6 comprising the through-hole, causing momentum loss and mixing.

FIG. 30 is a schematic top sectional view of a further example of an exhaust gas conduit system 2. Flow 4 of exhaust gas into and out of the exhaust gas conduit system 2 is depicted by the thick arrows. As in the embodiments described above, flow diverting structures 6 are provided that create a meandering flow. In this embodiment, the flow diverting structures 6 extend vertically (perpendicular to the plane of the page) from an inward facing lower surface of the exhaust gas conduit system 2 to an inward facing upper surface of the exhaust gas conduit system 2. The flow diverting structures 6 thus span all the way across a chamber of the exhaust gas conduit system 2 through which the exhaust gas flows. The heat exchange fluid circuit is configured as described above so that the heat exchange fluid flows through inner regions 8 of the flow diverting structures 6. In the example shown, eight V-shaped flow diverting structures 6 are shown. Each flow diverting structure 6 comprises plural conduits aligned in the vertical direction (perpendicular to the plane of the page). The plural conduits can be labelled alternatively 8A and 8B (a subset are labelled as examples) to represent a direction of flow of heat exchange fluid through them. The plural conduits are connected together in series in such a way that heat exchange fluid can flow through the conduits in a given flow diverting structure 4 in a sequence of upward flow (through conduits 8A) and downward flow (through conduits 8B). In an embodiment, an average flow direction of the heat exchange fluid (downwards in the plane of the page in the example of FIG. 30) is counter to an average flow direction of the exhaust gas (upwards in the plane of the page in the example of FIG. 30). FIG. 30 is an example of an embodiment in which a plurality of flow diverting structures 4 are provided that split the flow 4 of exhaust gas into plural separated flows. Two example separated flows are indicated by broken line arrows. The flow diverting structures 4 in this example create six separated flows in flow regions 21-26 that are bounded on each side in a lateral direction by two flow diverting structures 4 that face each other. The separated flows are recombined with each other downstream of where the splitting into the separated flows occurred. For the example two separated flows indicated by broken line arrows in FIG. 30, an approximate point of splitting is indicated by arrow 31 and an approximate point of recombination downstream is indicated by arrow 32. Differences in average flow path lengths (e.g. flow paths along central axes of the respective separated flows) for different separated flows between the splitting of the flow 4 of exhaust gas and the recombination of the separated flows (e.g. between any two or more of the separated flows in flow regions 21-26) are such as to promote destructive interference in a target wavelength band between sound waves propagating in the different separated flows. Thus, for example, a difference in path length along the broken line arrows in FIG. 30 between the point of splitting 31 and the point of recombination 32 may be arranged to be approximately equal to half a wavelength of a target wavelength to be suppressed by destructive interference. In an embodiment, a difference in flow path length is approximately equal for at least two different pairs of separated flows, optionally for at least three different pairs of separated flows. In the example of FIG. 30, the flow path length difference between separated flows corresponding to flow regions 21 and 22 is approximately the same as the flow path length difference between separated flows corresponding to flow regions 22 and 23. Similarly, the flow path length difference between separated flows corresponding to flow regions 26 and 25 is approximately the same as the flow path length difference between separated flows corresponding to flow regions 25 and 24. Embodiments of this type simultaneously provide efficient energy recovery and enhance noise suppression.

Where structures have been depicted above as have a rectangular or approximately rectangular form, it is understood that this is not essential. Other cross-sectional shapes could be used, including circular, oval, elliptical or other, with appropriate account being taken of trade offs between weight, cost and surface area for heat transfer, etc.

The invention claimed is:

1. An energy recovery system, comprising:
   an exhaust gas conduit system configured to guide a flow of exhaust gas generated by a combustion process;
   a heat exchange fluid circuit configured to guide a flow of a heat exchange fluid; and
   an electrical generator configured to generate electrical power from the flow of heat exchange fluid, wherein:
   the heat exchange fluid circuit is configured so that heat is transferred from the exhaust gas to the heat exchange fluid while the exhaust gas is flowing through the exhaust gas conduit system;
   the exhaust gas conduit system comprises a plurality of flow diverting structures that are each configured to locally divert the flow of the exhaust gas;
   the heat exchange fluid flows through an inner region of at least one of the flow diverting structures;
   the flow diverting structures are configured to cause the exhaust gas to adopt a meandering flow; and
   the meandering flow comprises an alternating sequence of changes in direction of opposite sense of at least 90 degrees.

2. The system of claim 1, wherein the inner region is at least partially sandwiched on both sides in the average flow direction by the flow of exhaust gas.

3. The system of claim 1, wherein the flow diverting structures form an alternating sequence of first flow diverting structures and second flow diverting structures that protrude into the flow of exhaust gas in opposite senses and interlock with each other, thereby promoting a meandering flow of the exhaust gas.

4. The system of claim 1, wherein at least a subset of the flow diverting structures protrude into the flow of the exhaust gas substantially perpendicularly to an average flow direction.

5. The system of claim 1, wherein:
   the flow diverting structures cause the exhaust gas to adopt a spatially periodic meandering flow through at least a portion of the exhaust gas conduit system; and
   the heat exchange fluid circuit causes the heat exchange fluid to adopt a spatially periodic meandering flow through at least a portion of the heat exchange fluid circuit, wherein:
   the periodic meandering flow of the exhaust gas has the same spatial frequency as the periodic meandering flow of the heat exchange fluid.

6. The system of claim 5, wherein the periodic meandering flow of the exhaust gas has a maximal amplitude in a first plane, the periodic meandering flow of the heat exchange fluid has a maximal amplitude in a second plane, and the first plane is angled relative to the second plane by at least 45 degrees.

7. The system of claim 6, wherein the first plane is substantially perpendicular to the second plane.

8. The system of claim 1, wherein the flow diverting structures comprise surface structure to enhance heat transfer between the exhaust gas and the heat exchange fluid.

9. The system of claim 1, wherein the plurality of flow diverting structures are configured so that the flow of exhaust gas is split into plural separated flows and the plural separated flows are recombined with each other downstream.

10. The system of claim 9, wherein differences in average flow path lengths for different separated flows between the splitting of the flow of exhaust gas and the recombination of the separated flows are such as to promote destructive interference in a target wavelength band between sound waves propagating in the different separated flows.

11. The system of claim 9, wherein a difference in average flow path length is approximately equal for at least two different pairs of the separated flows.

12. The system of claim 1, wherein the exhaust gas conduit system comprises catalytic converter material and the exhaust gas conduit system is configured to guide flow of the exhaust gas through the catalytic converter material.

13. The system of claim 12, wherein the catalytic converter material comprises at least a portion in which an average pore direction is substantially parallel to a local direction of the exhaust gas directly upstream of the portion of the catalytic converter material.

14. The system of claim 12, wherein the catalytic converter material comprises at least a portion in which an average pore direction is aligned obliquely to a local direction of the exhaust gas directly upstream of the portion of the catalytic converter material.

15. The system of claim 1, wherein the heat exchange fluid is selected so that the heat exchange fluid is transformed from a liquid to a vapour in each cycle of the heat exchange fluid through the heat exchange circuit.

16. The system of claim 15, wherein the liquid comprises plural liquid components of different composition.

17. A vehicle comprising:
   an internal combustion engine;
   an electrically powered device or battery; and
   the energy recovery system of claim 1, wherein the energy recovery system is configured to provide electrical power to the electrically powered device or battery.

18. A method of recovering energy, comprising:
   guiding flow of an exhaust gas generated by a combustion process through an exhaust gas conduit system;
   guiding flow of a heat exchange fluid through a heat exchange fluid circuit; and
   generating electrical power from the flow of the heat exchange fluid, wherein heat is transferred from the exhaust gas to the heat exchange fluid while the exhaust gas is flowing through the exhaust gas conduit system;
   wherein the exhaust gas conduit system comprises a plurality of flow diverting structures that each locally divert the flow of the exhaust gas,
   wherein the heat exchange fluid flows through an inner region of at least one of the flow diverting structures,
   wherein the flow diverting structures cause the exhaust gas to adopt a meandering flow, and wherein the meandering flow comprises an alternating sequence of changes in direction of opposite sense of at least 90 degrees.

* * * * *